(12) United States Patent
Toyama (10) Patent No.: US 6,606,204 B2
(45) Date of Patent: Aug. 12, 2003

(54) WIDE-ANGLE THREE-GROUP ZOOM LENS (75) Inventor: Nobuaki Toyama, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 9 days.

(21) Appl. No.: 10/094,027

(22) Filed: Mar. 11, 2002

(65) Prior Publication Data

US 2002/0191306 A1 Dec. 19, 2002

(30) Foreign Application Priority Data

Mar. 21, 2001 (JP) ........................................ 2001-081102

(51) Int. Cl.[7] ............................................. G02B 15/14
(52) U.S. Cl. ........................................ 359/689; 359/680
(58) Field of Search ........................ 359/689, 680–682, 359/683, 676

(56) References Cited

U.S. PATENT DOCUMENTS 5,604,637 A * 2/1997 Goosey, Jr. ................. 359/689
6,243,213 B1 * 6/2001 Mori ........................... 359/681
6,522,476 B2 * 2/2003 Koreeda ...................... 359/681
2002/0008920 A1 * 1/2002 Mihara et al. ............... 359/684

FOREIGN PATENT DOCUMENTS

JP 6-40170 2/1994
JP 10-26727 1/1998

* cited by examiner

Primary Examiner—Jordan M. Schwartz
(74) Attorney, Agent, or Firm—Snider & Associates; Ronald R. Snider

(57) ABSTRACT

A negative first lens group, a positive second lens group, and a positive third lens group are provided in sequence from an object side of a zoom lens. An aperture is provided in the second group of lenses. At the time of zooming operation, the three groups of lenses independently move over an optical axis X. The second group of lenses is constituted of, in sequence from the object side, a biconvex lens group 2A; a lens group 2B formed by cementing two or more lenses together; an aperture; a lens group 2C formed by cementing together two or more lenses; and a lens group 2D whose convex side is oriented toward the image surface side.

13 Claims, 8 Drawing Sheets

FIG.1A
EXAMPLE 1

FIG.1B
EXAMPLE 1

FIG.2A
EXAMPLE 2

FIG.2B
EXAMPLE 2

FIG.3A
EXAMPLE 3

FIG.3B
EXAMPLE 3

FIG.4A
EXAMPLE 4

FIG.4B
EXAMPLE 4

FIG.5A
EXAMPLE 1
F/3.65

W

-0.5    0.5
SPHERICAL
ABERRATION

FIG.5B
EXAMPLE 1
$\omega = 34.6°$

W

——— SAGITTAL
---- TANGENTIAL

-0.5    0.5
ASTIGMATISM

FIG.5C
EXAMPLE 1
$\omega = 34.6°$

W

-3%    3%
DISTORTION

FIG.5D
EXAMPLE 1
F/4.65

T

-0.5    0.5
SPHERICAL
ABERRATION

FIG.5E
EXAMPLE 1
$\omega = 17.9°$

T

——— SAGITTAL
---- TANGENTIAL

-0.5    0.5
ASTIGMATISM

FIG.5F
EXAMPLE 1
$\omega = 17.9°$

T

-3%    3%
DISTORTION

FIG.6A
EXAMPLE 2
F/3.65
W
SPHERICAL ABERRATION

FIG.6B
EXAMPLE 2
ω=34.6°
W
—— SAGITTAL
---- TANGENTIAL
ASTIGMATISM

FIG.6C
EXAMPLE 2
ω=34.6°
W
DISTORTION

FIG.6D
EXAMPLE 2
F/4.65
T
SPHERICAL ABERRATION

FIG.6E
EXAMPLE 2
ω=17.9°
T
—— SAGITTAL
---- TANGENTIAL
ASTIGMATISM

FIG.6F
EXAMPLE 2
ω=17.9°
T
DISTORTION

FIG.7A
EXAMPLE 3
F/3.65

FIG.7B
EXAMPLE 3
ω=34.6°

FIG.7C
EXAMPLE 3
ω=34.6°

FIG.7D
EXAMPLE 3
F/4.65

FIG.7E
EXAMPLE 3
ω=17.8°

FIG.7F
EXAMPLE 3
ω=17.8°

FIG.8A
EXAMPLE 4
F/3.65

W

−0.5  0.5
SPHERICAL
ABERRATION

FIG.8B
EXAMPLE 4
$\omega = 34.6°$

W
— SAGITTAL
---- TANGENTIAL

−0.5  0.5
ASTIGMATISM

FIG.8C
EXAMPLE 4
$\omega = 34.6°$

W

−3%  3%
DISTORTION

FIG.8D
EXAMPLE 4
F/4.65

T

−0.5  0.5
SPHERICAL
ABERRATION

FIG.8E
EXAMPLE 4
$\omega = 17.8°$

T
— SAGITTAL
---- TANGENTIAL

−0.5  0.5
ASTIGMATISM

FIG.8F
EXAMPLE 4
$\omega = 17.8°$

T

−3%  3%
DISTORTION

WIDE-ANGLE THREE-GROUP ZOOM LENS

RELATED APPLICATIONS

This application claims the priority of Japanese Patent Application No. 2001-81102 filed on Mar. 21, 2001, which is incorporated herein by reference.

BACKGROUND OF THE INVENTION

1. Field of the Invention

The present invention relates to a wide-angle three-group zoom lens, and more particularly, to a zoom lens which is suitable for use with a single-lens reflex (SLR) camera requiring a long back focal length, enables achievement of an angle of view of about 70 degrees at the wide-angle end thereof and a variable power ratio of about 2.2, and is composed of three groups.

2. Description of the Prior Art

There have hitherto been known various types of wide-angle zoom lenses which can realize a long back focal length required when the lens is provided in an SLR or the like and which involve lens arrangement of negative, positive, and negative.

Such zoom lenses include zoom lenses described in, e.g., Japanese Patent Publication No. 6(1994)-40170 and Japanese Unexamined Patent Publication No. 10(1998)-26727.

The zoom lenses described in the publications have lens system whose overall lengths are comparatively small and have achieved a zoom ratio of about 2.5.

However, each of the zoom lenses described in the publication suffers from an increase in the diameter of an object-side lens (front lens) in a first group of lenses. As a result, miniaturization of the overall lens system and a lens barrel is hindered, thereby posing difficulty in increasing the speed of zooming response.

The present invention has been conceived in view of the above circumstances and aims at providing a wide-angle three-group zoom lens which assures a required back focal length, a reduction in overall length, and miniaturization of a lens system by means of reducing the diameter of a front lens while maintaining superior optical performance.

SUMMARY OF THE INVENTION

The present invention provides a wide-angle three-group zoom lens, comprising a first group of lenses having negative refracting power, a second group of lenses having positive refracting power, and a third group of lenses having positive refracting power, which are provided in sequence from an object side of the zoom lens, wherein zooming is effected by changing intervals between the lens groups; and wherein the second group of lenses further comprises, in sequence from the object side, a biconvex lens group 2A, a lens group 2B formed by cementing two or more lenses together, an aperture, a lens group 2C formed by cementing together two or more lenses, and a lens group 2D which has positive refracting power and whose convex side is oriented toward the image surface side.

Preferably, the third group of lenses is composed of two lenses; that is, a negative lens 3A whose concave side is oriented toward the object, and a positive lens 3B whose convex surface is oriented toward an image surface side of the zoom lens.

Preferably, the first group of lenses comprises, in sequence from the object side, five lenses; that is, a lens 1A having the shape of a negative meniscus and whose convex side is oriented toward the object; a lens 1B having the shape of a negative meniscus and whose convex side is oriented toward the object; a cemented lens formed from a negative lens 1C whose concave side is oriented toward the object and a positive lens 1D; and a positive lens 1E whose convex side is oriented toward the object.

Preferably, the lens group 2C is constituted by means of cementing two lenses together. More preferably, the lens group 2B is constituted by means of cementing three lenses together.

The present invention provides a wide-angle three-group zoom lens, comprising a first group of lenses having negative refracting power, a second group of lenses having positive refracting power, and a third group of lenses having positive refracting power, which are provided in sequence from an object side of the zoom lens, wherein zooming is effected by changing intervals between the lens groups; the second group of lenses further comprises, in sequence from the object side, a biconvex lens group 2A, a lens group 2B formed by cementing three lenses together, an aperture, a lens group 2C formed by cementing together two lenses, and a lens group 2D which has positive refracting power and whose convex side is oriented toward the image surface side; wherein conditional equation (1) provided below is satisfied, provided that a combined focal length of the lens group 2A and the lens group 2B is set to $f_{2F}$ and that a combined focal length of the lens group 2C and the lens group 2D is set as $f_{2R}$.

$$-0.7 < \frac{f_{2F}}{f_{2R}} < +0.1 \quad (1)$$

Preferably, conditional equation (2) provided below is satisfied, provided that a radius of curvature of an object-side cementing surface of the lens group 2B is taken as $R_{22F}$ and an image-surface-side cementing surface of the lens group 2B is taken as $R_{22R}$.

$$-1.5 < \frac{R_{22R}}{R_{22F}} < +0.1 \quad (2)$$

DESCRIPTION OF THE PREFERRED EMBODIMENTS

Specific examples of a wide-angle three-group zoom lens according to the present invention will be described hereinafter by reference to the accompanying drawings. Respective drawings show trails of movement of respective lens groups performed at the time of zooming. Numerical data to be described in connection with examples provided below are dimensionless.

EXAMPLE 1

Figure 1A:
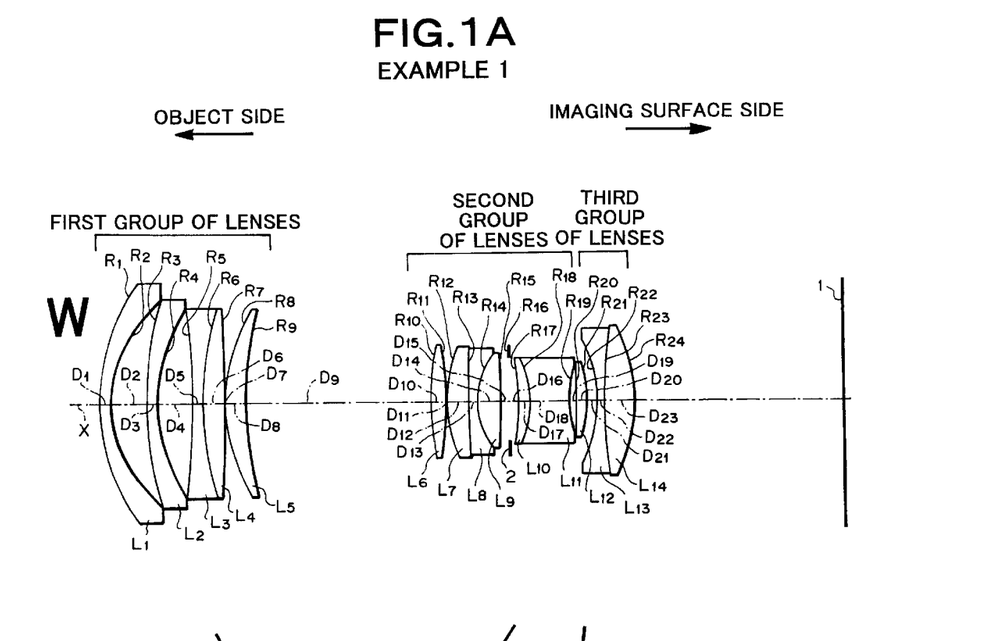
FIGS. 1A and 1B are schematic diagrams showing the principal configuration of a lens according to Example 1 of the present invention.
Figure 1B:
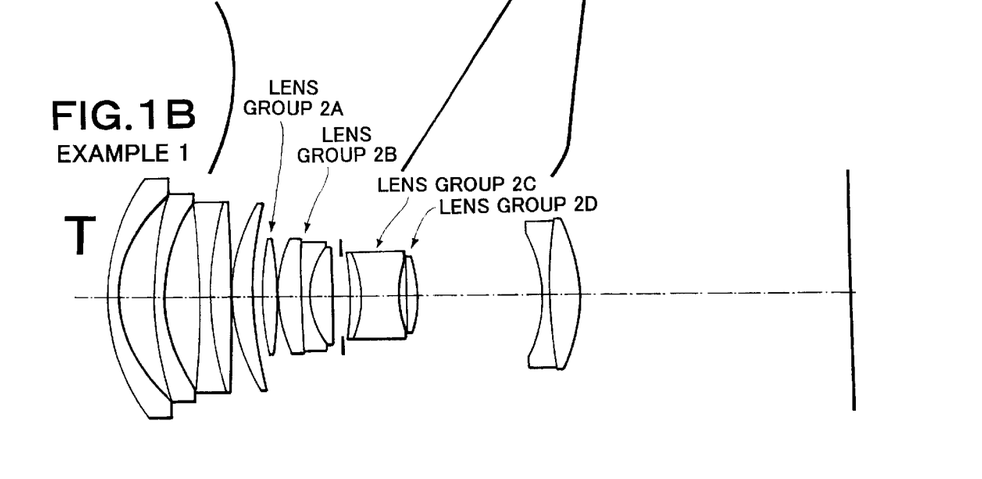

FIGS. 1A and 1B are schematic diagrams showing the principal configuration of a zoom lens according to Example 1 (i.e., positions of lenses at the wide-angle end and those at the telephoto end).

As shown in FIGS. 1A and 1B, the zoom lens according to Example 1 comprises, sequentially from an object-side thereof, a first group of lenses having negative refractive power, a second group of lenses having positive refractive power, and a third group of lenses having positive refractive power. An aperture 2 is provided in the second group of lenses. At the time of zooming operation, the three groups of lenses are moved independently along an optical axis X, thereby changing a focal length "f" of the overall lens system, and a luminous flux is caused to converge at an imaging position P on an image surface side 1.

The first group of lenses comprises, sequentially from the object side of the zoom lens, first and second lenses $L_1$ and $L_2$ whose convex sides are oriented toward the object and which assume the shape of a negative meniscus; a biconcave third lens $L_3$ and a fourth biconvex lens $L_4$, which constitute a cemented lens; and a fifth lens $L_5$ assuming the shape of a positive meniscus.

The second group of lenses comprises, sequentially from the object side, a sixth biconvex $L_6$, a seventh lens $L_7$ which assumes the shape of a positive meniscus and whose convex side is oriented toward the object; an eighth lens $L_8$ which assumes the shape of a negative meniscus and whose concave side is oriented toward the image surface side; a ninth biconvex lens $L_9$; an aperture 2; a tenth lens $L_{10}$ which assumes the shape of a positive meniscus and whose convex side is oriented toward the image surface side; a biconcave eleventh lens $L_{11}$; and a twelfth lens $L_{12}$ which assumes the shape of a positive meniscus and whose convex side is oriented toward the image surface side. Of the second group of lenses, the seventh lens $L_7$, the eighth lens $L_8$, and the ninth lens $L_9$ are cemented together, and the tenth lens $L_{10}$ and the eleventh biconcave lens $L_{11}$ are cemented together.

The third group of lenses comprises, sequentially from the object side of the zoom lens, a thirteenth biconcave lens $L_{13}$ and a biconvex lens $L_{14}$, which are cemented together.

By means of specifying the geometries of the respective lenses, aberrations can be excellently corrected throughout the overall zoom range, and high optical performance is achieved throughout the overall object distance. Hence, the diameter of the front lens can be reduced as compared with the related art.

The zoom lens according to Example 1 is constructed so as to satisfy the following conditional equations (1) and (2).

The following conditional equation (1) is satisfied, provided that a combined focal length of a lens group 2A (i.e., the sixth lens $L_6$) and a lens group 2B (i.e., the seventh lens $L_7$, the eighth lens $L_8$, and the ninth lens $L_9$) is set as $f_{2F}$ and that a combined focal length of a lens group 2C (i.e., the tenth lens $L_{10}$ and the eleventh lens $L_{11}$) and a lens group 2D (i.e., the twelfth lens $L_{12}$) is set as $f_{2R}$.

$$-0.7 < \frac{f_{2F}}{f_{2R}} < +0.1 \qquad (1)$$

The following conditional equation (2) is satisfied, provided that a radius of curvature of an object-side cementing surface of the lens group 2B is taken as $R_{22F}$ and an image-surface-side cementing surface of the lens group 2B is taken as $R_{22R}$.

$$-1.5 < \frac{R_{22R}}{R_{22F}} < +0.1 \qquad (2)$$

Here, $f_{2F}$: a combined focal length of the lens groups 2A and 2B, $f_{2R}$: a combined focal length of the lens groups 2C and 2D, $R_{22F}$: a radius of curvature of an object-side cementing surface of the lens group 2B, and $R_{22R}$: a radius of curvature of an image-surface-side cementing surface of the lens group 2B, and $f_w$: a focal length of the overall lens system in the wide-angle end thereof.

Technical significance of conditional equations (1) and (2) will now be described.

Conditional equation (1) specifies a ratio of the power of two object-side lens groups of the second group of lenses to the power of two image-surface-side lens groups of the same. If the power ratio exceeds the upper limit, spherical aberration increases and becomes difficult to correct, thereby resulting in an increase in the overall length of the lens system. In contrast, if the smallest power ratio has become smaller than the lower limit, curvature of field and coma aberration increase and become difficult to correct.

In a case where the lens group 2B is constituted of three cemented lenses, conditional equation (2) specifies a ratio between a radius of curvature of an object-side cementing surface and a radius of curvature of an image-surface-side cementing surface. If the ratio exceeds the upper limit or becomes lower than the lower limit, spherical aberration increases and becomes difficulty to correct.

Provided in the top of Table 1 as follows are numerals corresponding to curvature radii R of respective lens surfaces of the zoom lens according to Example 1; those corresponding to the center thicknesses of respective lenses and air gaps D of respective lenses; those corresponding to refractive indices $N_d$ of respective lenses when taken along line "d"; and those corresponding to Abbe numbers $v_d$.

Numerals corresponding to symbols R, D, $N_d$, and $v_d$ in Table 1 and those corresponding to the same symbols in Tables 2, 3, and 4 as follows to be described later sequentially increase from the object side of the zoom lens.

Table 1 also shows an interval $D_9$ between the first group of lenses and the second group of lenses at the wide-angle end (WIDE) and telephoto end (TELE) of the lens system, and an interval $D_{21}$ between the second group of lenses and the third group of lenses at the wide-angle end (WIDE) and telephoto end (TELE) of the lens system.

The focal length f' and F number (FNO) of the overall lens system from the wide-angle end to telephoto end thereof are set as shown in Table 1.

As shown in Table 5 as follows, a value derived from $f_{2F}/f_{2R}$ in conditional equation (1) assumes a value of –0.6, and a value derived from $R_{22R}/R_{22F}$ in conditional equation (2) assumes a value of 0.05. Thus, both conditional equations (1) and (2) are satisfied.

EXAMPLE 2

Figure 2A:
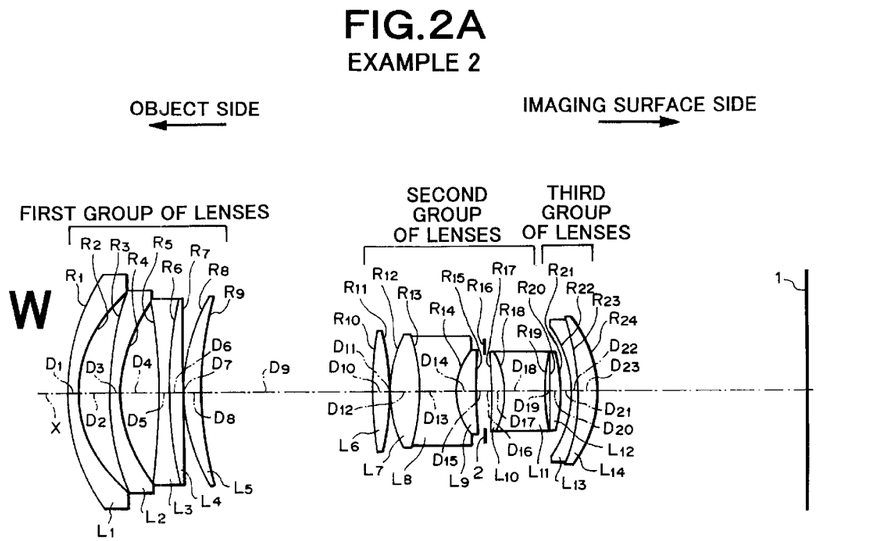
FIGS. 2A and 2B are schematic diagrams showing the principal configuration of a lens according to Example 2 of the present invention.
Figure 2B:
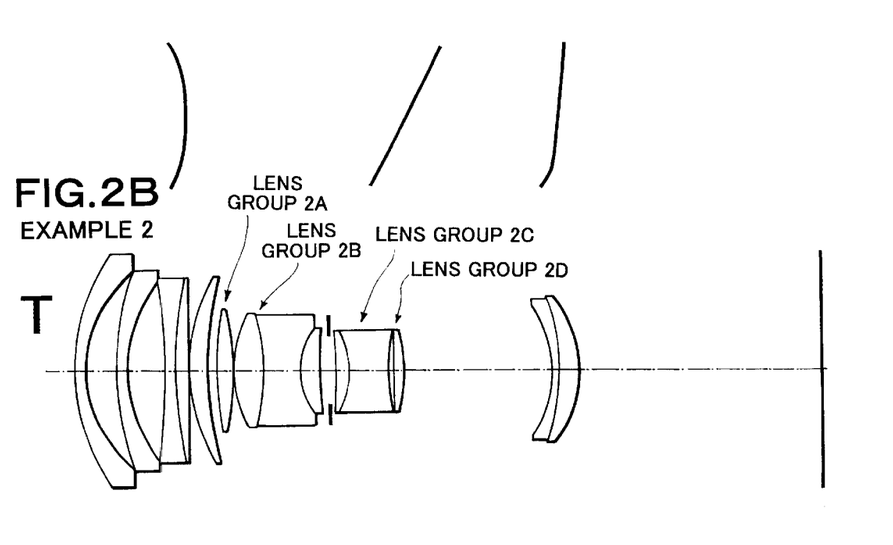

A zoom lens according to Example 2 is substantially identical in configuration with the zoom lens described in connection with Example 1. However, they differ from each other in that the fourth lens $L_4$ assumes the shape of a positive meniscus and its convex side is oriented toward the object; the eighth lens $L_8$ is embodied as a biconcave lens; the ninth lens $L_9$ assumes the shape of a positive meniscus and its convex side is oriented toward the object; the thirteenth lens $L_{13}$ assumes the shape of a negative meniscus and its convex side is oriented toward the image surface side; and the fourteenth lens $L_{14}$ assumes the shape of a positive meniscus and its convex side is oriented toward the image surface side.

Provided in the top of Table 2 are numerals corresponding to curvature radii R of respective lens surfaces of the zoom lens according to Example 2; those corresponding to the center thicknesses of respective lenses and air gaps D of respective lenses; those corresponding to refractive indices $N_d$ of respective lenses when taken along line "d"; and those corresponding to Abbe numbers $v_d$.

Table 2 also shows an interval $D_9$ between the first group of lenses and the second group of lenses at the wide-angle end (WIDE) and telephoto end (TELE) of the lens system, and an interval $D_{21}$ between the second group of lenses and the third group of lenses at the wide-angle end (WIDE) and telephoto end (TELE) of the lens system.

The focal length f' and F number (FNO) of the overall lens system from the wide-angle end to telephoto end thereof are set as shown in Table 2.

As shown in Table 5, the value derived from $f_{2F}/f_{2R}$ in conditional equation (1) assumes a value of 0.00, and the value derived from $R_{22R}/R_{22F}$ in conditional equation (2) assumes a value of –0.34. Thus, both conditional equations (1) and (2) are satisfied. Table 5 shows the back focal lengths at the wide-angle end and the telephoto end of the zoom lens according to Example 2.

EXAMPLE 3

Figure 3A:
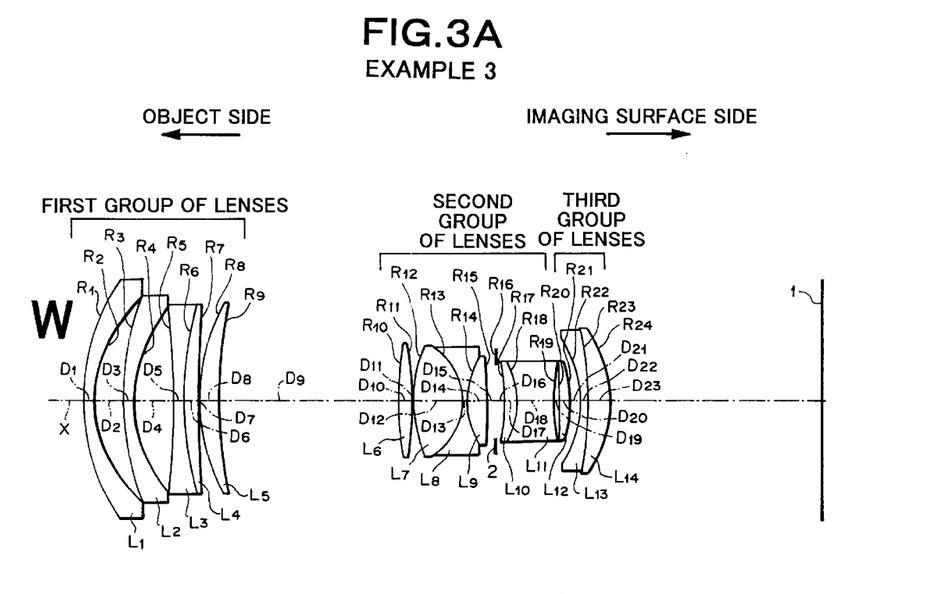
FIGS. 3A and 3B are schematic diagrams showing the principal configuration of a lens according to Example 3 of the present invention.
Figure 3B:
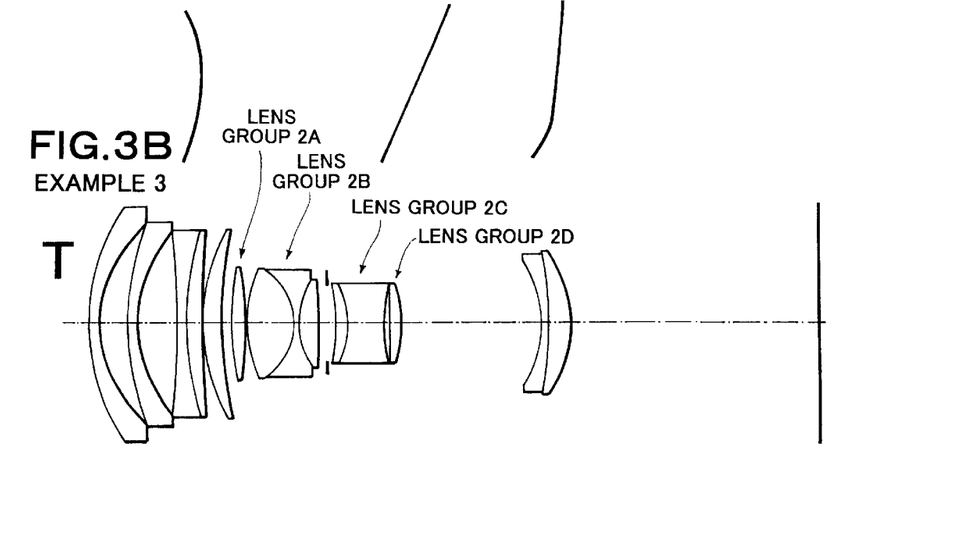

A zoom lens according to Example 3 is substantially identical in configuration with the zoom lens described in connection with Example 2. However, they greatly differ from each other, in that the ninth lens $L_9$ is embodied as a biconvex lens.

Provided in Table 3 are numerals corresponding to curvature radii R of respective lens surfaces of the zoom lens according to Example 3; those corresponding to the center thicknesses of respective lenses and air gaps D of respective lenses; those corresponding to refractive indices $N_d$ of respective lenses when taken along line "d"; and those corresponding to Abbe numbers $v_d$.

Table 3 also shows an interval $D_9$ between the first group of lenses and the second group of lenses at the wide-angle end (WIDE) and the telephoto end (TELE) of the lens system, and an interval $D_{21}$ between the second group of lenses and the third group of lenses at the wide-angle end (WIDE) and the telephoto end (TELE) of the lens system.

The focal length f' and F number (FNO) of the overall lens system from the wide-angle end to the telephoto end thereof are set as provided in lower rows in Table 3.

As shown in Table 5, the value derived from $f_{2F}/f_{2R}$ in conditional equation (1) assumes a value of 0.35, and the value derived from $R_{22R}/R_{22F}$ in conditional equation (2) assumes a value of –1.30. Thus, both conditional equations (1) and (2) are satisfied. Table 5 shows the back focal lengths at the wide-angle end and the telephone end of the zoom lens according to Example 3.

EXAMPLE 4

Figure 4A:
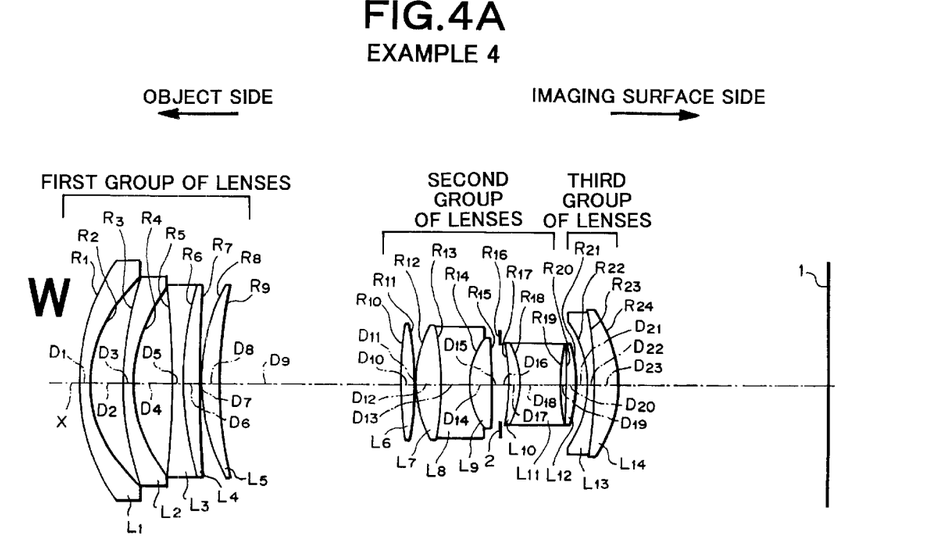
FIGS. 4A and 4B are schematic diagrams showing the principal configuration of a lens according to Example 4 of the present invention.
Figure 4B:
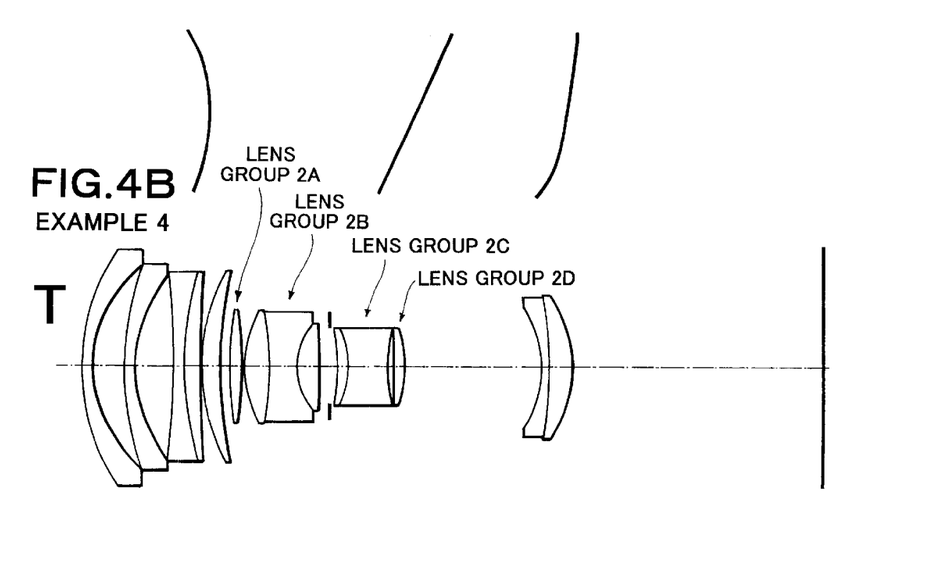
Figure 5A:
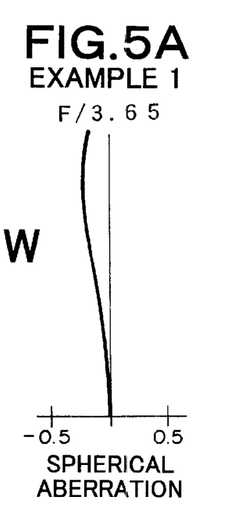
FIGS. 5A through 5F are aberration charts showing spherical aberration, astigmatism, and distortion appearing at the wide-angle end and at the telephoto end of the lens according to Example 1.
Figures 5B, 5C:
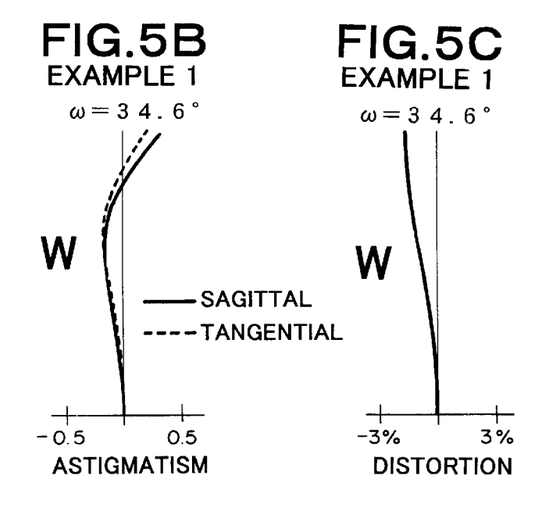
Figure 5D:
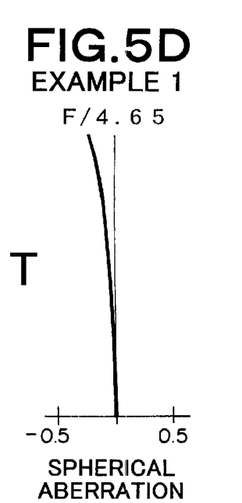
Figures 5E, 5F:
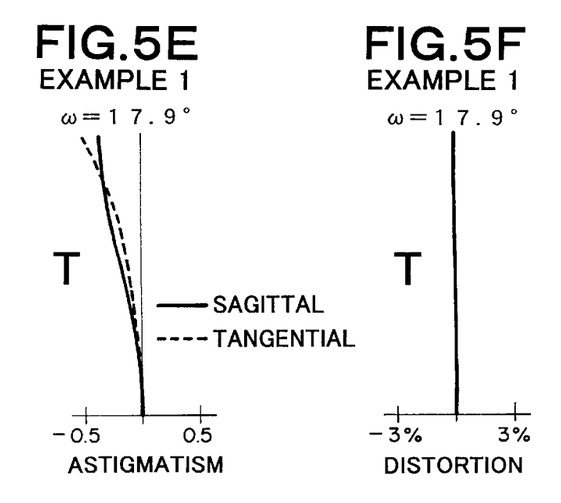
Figure 6A:
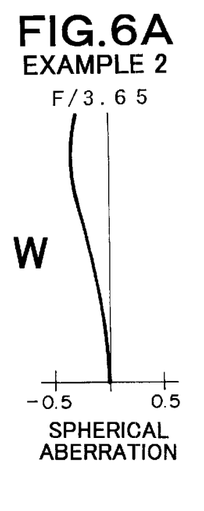
FIGS. 6A through 6F are aberration charts showing spherical aberration, astigmatism, and distortion appearing at the wide-angle end and at the telephoto end of the lens according to Example 2.
Figure 6B:
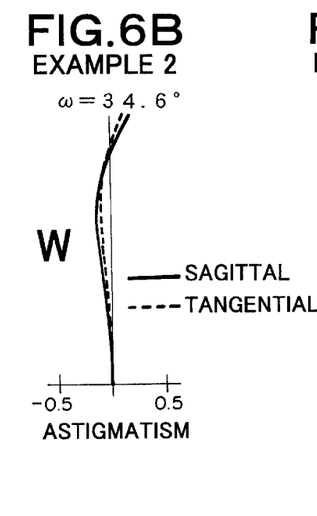
Figure 6C:
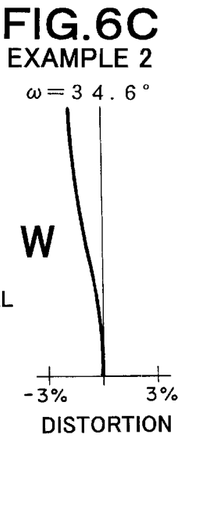
Figure 6D:
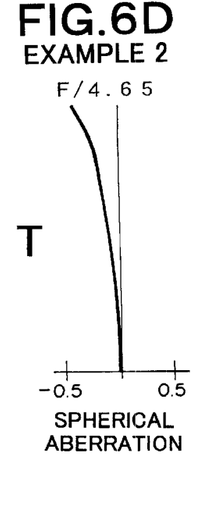
Figure 6E:
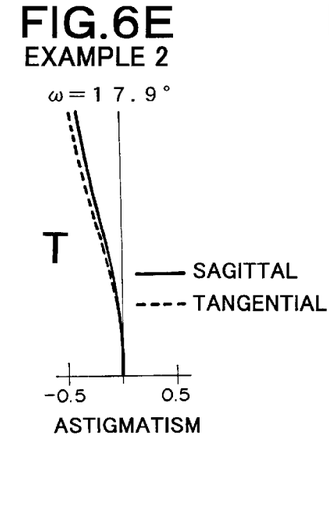
Figure 6F:
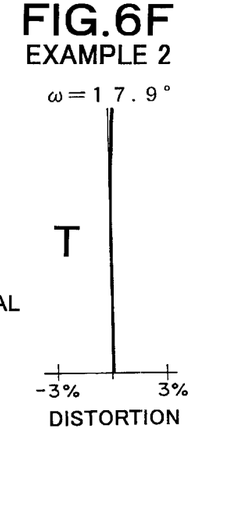
Figure 7A:
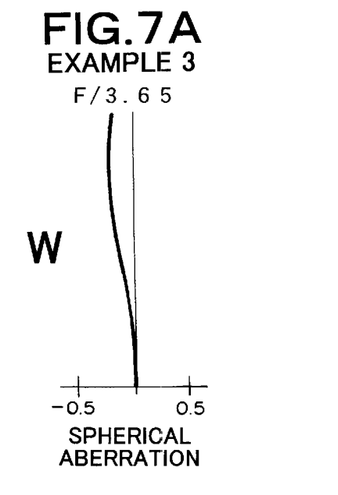
FIGS. 7A through 7F are aberration charts showing spherical aberration, astigmatism, and distortion appearing at the wide-angle end and at the telephoto end of the lens according to Example 3.
Figure 7B:
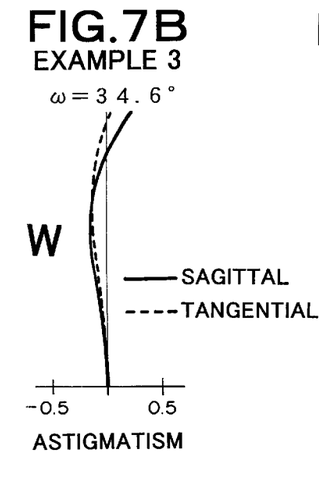
Figure 7C:
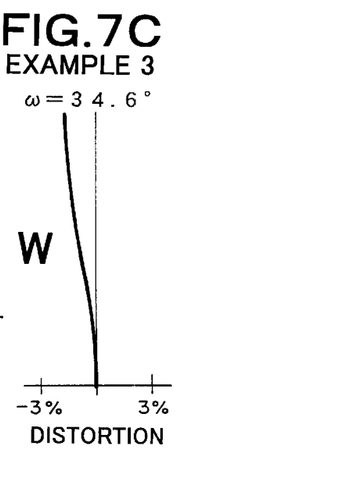
Figure 7D:
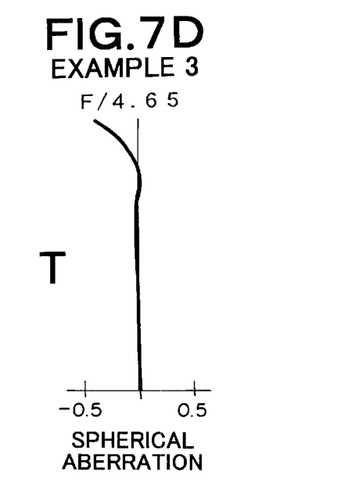
Figure 7E:
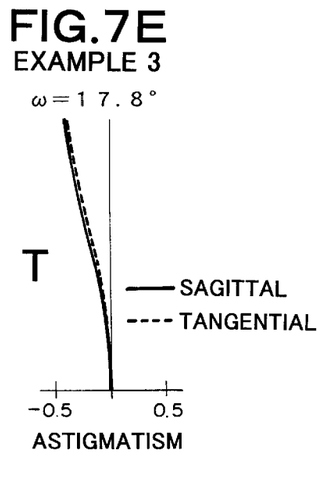
Figure 7F:
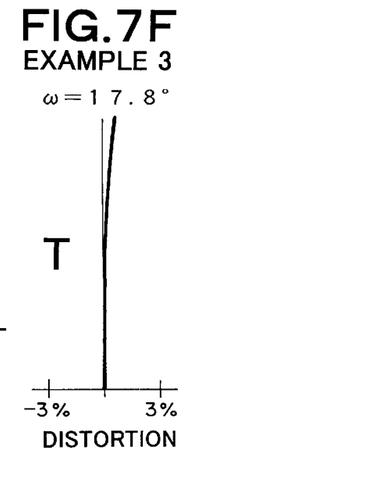
Figure 8A:
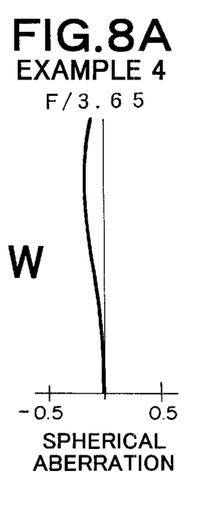
FIGS. 8A through 8F are aberration charts showing spherical aberration, astigmatism, and distortion appearing at the wide-angle end and at the telephoto end of the lens according to Example 4.
Figure 8B:
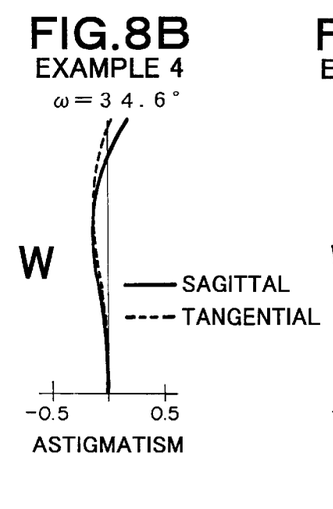
Figure 8C:
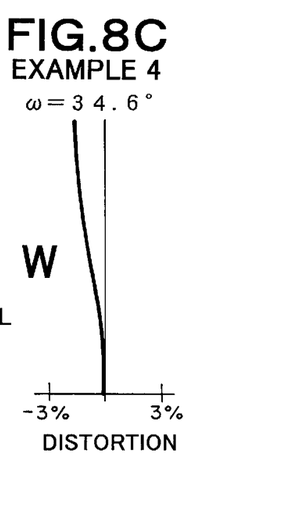
Figure 8D:
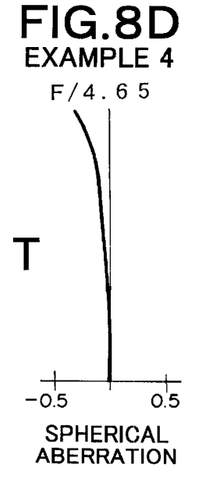
Figure 8E:
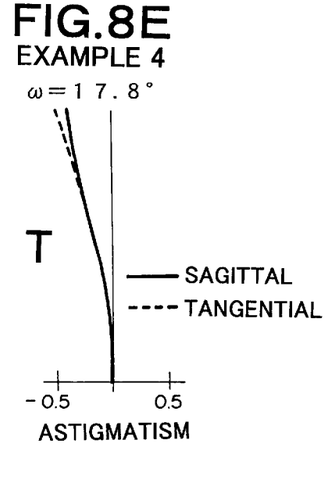
Figure 8F:
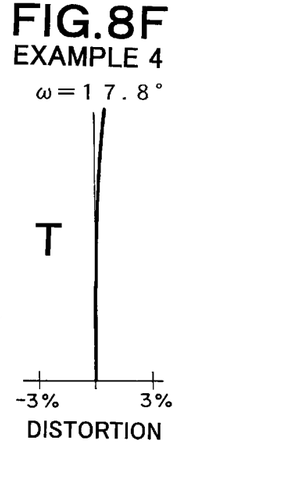

A zoom lens according to Example 4 is substantially identical in configuration with the zoom lens described in connection with Example 2. However, they greatly differ from each other, in that the ninth lens $L_9$ is embodied as a biconvex lens.

Provided in Table 4 are numerals corresponding to curvature radii R of respective lens surfaces of the zoom lens according to Example 4; those corresponding to the center thicknesses of respective lenses and air gaps D of respective lenses; those corresponding to refractive indices $N_d$ of respective lenses when taken along line "d"; and those corresponding to Abbe numbers $v_d$.

Table 4 also shows an interval $D_9$ between the first group of lenses and the second group of lenses at the wide-angle end (WIDE) and the telephoto end (TELE) of the lens system, and an interval $D_{21}$ between the second group of lenses and the third group of lenses at the wide-angle end (WIDE) and the telephoto end (TELE) of the lens system.

The focal length f' and F number (FNO) of the entire lens system from the wide-angle end to the telephoto end thereof are set as provided in lower rows in Table 4.

As shown in Table 5, the value derived from $f_{2F}/f_{2R}$ in conditional equation (1) assumes a value of –0.34, and the value derived from $R_{22R}/R_{22F}$ in conditional equation (2) assumes a value of –0.24. Thus, both conditional equations (1) and (2) are satisfied. Table 5 shows the back focal lengths at the wide-angle end telephone end of the zoom lens according to Example 4.

FIGS. 5A through 8F are aberration charts showing various aberrations (i.e., spherical aberrations, astigmatisms, and distortions) appearing at the wide-angle and telephoto ends of the zoom lenses described in connection with Examples 1 through 4. Each of the aberration charts shows aberrations with respect to a sagittal plane and a tangential image surface side.

As is evident from the aberration charts, the zoom lenses described in connection with Examples can correct aberrations excellently.

The zoom lenses described in connection with Examples 1 through 4 are set such that an angle of view of about 70 degrees is obtained at the wide-angle end of the lens and such that a zoom ratio of about 2.2 is obtained. Hence, the zoom lenses have superior optical performance throughout the entire object distance.

The wide-angle three-group zoom lens according to the present invention is not limited to the zoom lenses described in connection with Examples 1 through 4. The zoom lens can be embodied while the number of lenses constituting respective lens groups or the geometries of the lenses are varied, as required.

In a wide-angle three-group zoom lens according to the present invention, the second group of lenses extending across an aperture is configured such that the aperture is interposed between cemented lenses. Alternatively, the second group of lenses are arranged so as to satisfy predetermined conditional equations. As a result, aberrations can be excellently corrected throughout the entire photographing area from a long distance to a short distance. Further, a required back focal length can be ensured, and the overall length of the zoom lens system can be shortened. The diameter of a front lens can be reduced, thus rendering the lens system compact.

TABLE 1

| Surface | R | D | $N_d$ | $v_d$ |
|---|---|---|---|---|
| 1 | 61.1354 | 3.0000 | 1.80500 | 47.5 |
| 2 | 38.4668 | 10.1410 | | |
| 3 | 102.1953 | 3.0000 | 1.80500 | 47.5 |
| 4 | 48.7562 | 10.2747 | | |
| 5 | −235.5113 | 3.0000 | 1.80500 | 47.5 |
| 6 | 93.7017 | 6.2633 | 1.80497 | 24.8 |
| 7 | −588.6100 | 0.1000 | | |
| 8 | 50.9462 | 5.9455 | 1.49001 | 61.7 |
| 9 | 110.8892 | 53.6074 to 2.9813 | | |
| 10 | 91.6947 | 4.2861 | 1.49700 | 81.6 |
| 11 | −112.4358 | 0.1000 | | |
| 12 | 41.9060 | 6.4765 | 1.80500 | 47.5 |
| 13 | 422.9249 | 2.2218 | 1.60591 | 39.9 |
| 14 | 22.6447 | 7.1568 | 1.49700 | 81.6 |
| 15 | −317.8376 | 2.7000 | | |
| 16 (APERTURE) | ∞ | 2.0000 | | |
| 17 | −70.8604 | 3.3671 | 1.80499 | 31.8 |
| 18 | −29.3579 | 11.2852 | 1.80500 | 42.3 |
| 19 | 40.2511 | 1.8051 | | |
| 20 | −577.6538 | 3.2107 | 1.58369 | 61.8 |
| 21 | −37.1108 | 3.1963 to 36.2025 | | |
| 22 | −39.4273 | 2.0000 | 1.54720 | 46.2 |
| 23 | 149.9025 | 8.7019 | 1.72085 | 55.5 |
| 24 | −47.8278 | | | | f' = 51.63 to 108.42
FNO = 3.65 to 4.65

TABLE 2

| Surface | R | D | $N_d$ | $v_d$ |
|---|---|---|---|---|
| 1 | 62.3438 | 3.0000 | 1.80500 | 35.7 |
| 2 | 37.4335 | 9.0505 | | |
| 3 | 88.0061 | 3.0000 | 1.80500 | 47.5 |
| 4 | 42.8985 | 11.1813 | | |
| 5 | −181.7100 | 3.0000 | 1.65120 | 58.9 |
| 6 | 132.9246 | 3.7732 | 1.80501 | 24.7 |
| 7 | 814.1023 | 0.1000 | | |
| 8 | 55.1859 | 5.1352 | 1.80501 | 32.1 |
| 9 | 104.8636 | 49.4355 to 2.9686 | | |
| 10 | 116.1086 | 4.9631 | 1.49700 | 81.6 |
| 11 | −77.1436 | 0.1000 | | |
| 12 | 37.2374 | 8.6316 | 1.75952 | 48.6 |
| 13 | −59.0895 | 10.4890 | 1.80503 | 43.5 |
| 14 | 20.1183 | 5.6893 | 1.49700 | 81.6 |
| 15 | 172.8369 | 2.7000 | | |
| 16 (APERTURE) | ∞ | 2.0000 | | |
| 17 | −120.7023 | 3.6913 | 1.51103 | 52.9 |
| 18 | −26.4439 | 11.9011 | 1.64942 | 41.3 |
| 19 | 63.7744 | 1.1515 | | |
| 20 | −62425.7755 | 3.1210 | 1.80500 | 47.5 |
| 21 | −44.5881 | 3.2331 to 42.9946 | | |
| 22 | −33.4901 | 1.9999 | 1.58329 | 39.8 |
| 23 | −62.3615 | 5.3682 | 1.71611 | 55.7 |
| 24 | −35.9284 | | | | f' = 51.64 to 108.43
FNO = 3.65 to 4.65

TABLE 3

| Surface | R | D | $N_d$ | $v_d$ |
|---|---|---|---|---|
| 1 | 65.1249 | 3.0000 | 1.80500 | 26.0 |
| 2 | 39.8395 | 8.3963 | | |
| 3 | 84.2402 | 3.0000 | 1.80500 | 47.5 |
| 4 | 42.5330 | 11.5874 | | |
| 5 | −242.2514 | 3.0000 | 1.73059 | 54.9 |
| 6 | 103.9802 | 4.2821 | 1.80500 | 24.7 |
| 7 | 424.1088 | 0.1000 | | |
| 8 | 58.9030 | 5.5391 | 1.80500 | 29.0 |
| 9 | 134.3582 | 53.0780 to 2.9739 | | |
| 10 | 88.6014 | 4.4444 | 1.49700 | 81.6 |
| 11 | −101.0786 | 0.1000 | | |
| 12 | 41.4368 | 14.1381 | 1.80500 | 25.0 |
| 13 | −18.9028 | 1.4000 | 1.80463 | 24.8 |
| 14 | 24.5736 | 6.0238 | 1.49700 | 81.6 |
| 15 | −172.5263 | 2.7000 | | |
| 16 (APERTURE) | ∞ | 2.0000 | | |
| 17 | −55.2122 | 3.8303 | 1.64685 | 33.8 |
| 18 | −25.1686 | 10.9367 | 1.74861 | 38.9 |
| 19 | 57.4286 | 1.4218 | | |
| 20 | −395.8947 | 3.1534 | 1.80500 | 46.1 |
| 21 | −39.1332 | 3.2048 to 41.2939 | | |
| 22 | −33.6172 | 2.0000 | 1.56475 | 42.9 |
| 23 | −115.6218 | 6.4529 | 1.72422 | 55.3 |
| 24 | −38.1345 | | | | f' = 51.64 to 108.44
FNO = 3.65 to 4.65

TABLE 4

| Surface | R | D | $N_d$ | $v_d$ |
|---|---|---|---|---|
| 1 | 65.2444 | 3.0000 | 1.80500 | 47.5 |
| 2 | 39.5761 | 9.1586 | | |
| 3 | 94.8163 | 3.0000 | 1.80500 | 47.5 |
| 4 | 44.3033 | 11.2857 | | |
| 5 | −219.3904 | 3.0000 | 1.72527 | 55.2 |
| 6 | 101.3889 | 4.9416 | 1.80500 | 24.8 |
| 7 | 1040.4310 | 0.1000 | | |
| 8 | 59.4109 | 5.2968 | 1.80499 | 47.5 |
| 9 | 125.1608 | 52.9237 to 2.9856 | | |
| 10 | 117.7123 | 4.2594 | 1.49700 | 81.6 |
| 11 | −92.5017 | 0.1000 | | |
| 12 | 36.3382 | 7.3899 | 1.80500 | 47.5 |
| 13 | −86.1639 | 8.2119 | 1.80500 | 42.3 |
| 14 | 20.4156 | 6.6634 | 1.49700 | 81.6 |
| 15 | −263.3374 | 2.7000 | | |
| 16 (APERTURE) | ∞ | 2.0000 | | |
| 17 | −64.5820 | 3.1006 | 1.71828 | 29.1 |
| 18 | −27.0318 | 11.9856 | 1.80500 | 36.1 |
| 19 | 59.5566 | 1.2548 | | |
| 20 | −723.4867 | 3.0531 | 1.80500 | 47.5 |
| 21 | −41.6050 | 3.2003 to 40.1607 | | |
| 22 | −32.8432 | 2.0000 | 1.55795 | 44.1 |
| 23 | −139.9993 | 6.7543 | 1.73792 | 54.2 |
| 24 | −38.3990 | | | | f' = 51.63 to 108.42
FNO = 3.65 to 4.65

TABLE 5

| | Example 1 | Example 2 | Example 3 | Example 4 |
|---|---|---|---|---|
| $f_{2F}$ | 39.467 | 54.637 | 44.868 | 45.921 |
| $f_{2R}$ | −66.001 | 40721.724 | −130.158 | −134.253 |
| $Bf_W$ | 60.011 | 60.032 | 61.775 | 60.027 |
| $Bf_T$ | 77.385 | 70.054 | 72.270 | 71.751 |
| $f_{2F}/f_{2R}$ | −0.600 | 0.000 | −0.350 | −0.340 |
| $R_{22R}/R_{22F}$ | 0.050 | −0.340 | −1.300 | −0.240 |

What is claimed is:

1. A wide-angle three-group zoom lens, comprising:

a first group of lenses having negative refracting power, a second group of lenses having positive refracting power, and a third group of lenses having positive refracting power, which are provided in sequence from an object side of the zoom lens, wherein zooming is effected by changing intervals between said lens groups; and wherein said second group of lenses further comprises, in sequence from said object side, a biconvex lens group 2A, a lens group 2B formed by cementing two or more lenses together, an aperture, a lens group 2C formed by cementing two or more lenses together, and a lens group 2D which has positive refracting power and whose convex side is oriented toward the image surface side.

2. The wide-angle three-group zoom lens according to claim 1, wherein said third group of lenses is composed of two lenses: a negative lens 3A whose concave side is oriented toward the object and a positive lens 3B whose convex surface is oriented toward an image surface side of the zoom lens.

3. The wide-angle three-group zoom lens according to claim 1, wherein said first group of lenses comprises, in sequence from said object side, five lenses: a lens 1A having the shape of a negative meniscus and whose convex side is oriented toward the object; a lens 1B having the shape of a negative meniscus and whose convex side is oriented toward the object; a cemented lens formed from a negative lens 1C whose concave side is oriented toward the object and a positive lens 1D; and a positive lens 1E whose convex side is oriented toward the object.

4. The wide-angle three-group zoom lens according to claim 2, wherein said first group of lenses comprises, in sequence from said object side, five lenses: a lens 1A having the shape of a negative meniscus and whose convex side is oriented toward the object; a lens 1B having the shape of a negative meniscus and whose convex side is oriented toward the object; a cemented lens formed from a negative lens 1C whose concave side is oriented toward the object and a positive lens 1D; and a positive lens 1E whose convex side is oriented toward the object.

5. The wide-angle three-group zoom lens according to claim 1, wherein said lens group 2C is constituted by means of cementing two lenses together.

6. The wide-angle three-group zoom lens according to claim 2, wherein said lens group 2C is constituted by means of cementing two lenses together.

7. The wide-angle three-group zoom lens according to claim 3, wherein said lens group 2C is constituted by means of cementing two lenses together.

8. The wide-angle three-group zoom lens according to claim 1, wherein said lens group 2B is constituted by means of cementing three lenses together.

9. The wide-angle three-group zoom lens according to claim 2, wherein said lens group 2B is constituted by means of cementing three lenses together.

10. The wide-angle three-group zoom lens according to claim 3, wherein said lens group 2B is constituted by means of cementing three lenses together.

11. The wide-angle three-group zoom lens according to claim 4, wherein said lens group 2B is constituted by means of cementing three lenses together.

12. A wide-angle three-group zoom lens, comprising:

a first group of lenses having negative refracting power, a second group of lenses having positive refracting power, and a third group of lenses having positive refracting power, which are provided in sequence from an object side of the zoom lens, wherein zooming is effected by changing intervals between said lens groups; said second group of lenses further comprises, in sequence from said object side, a biconvex lens group 2A, a lens group 2B formed by cementing three lenses together, an aperture, a lens group 2C formed by cementing together two lenses, and a lens group 2D which has positive refracting power and whose convex side is oriented toward the image surface side; wherein conditional equation (1) provided below is satisfied, provided that a combined focal length of said lens group 2A and said lens group 2B is set as $f_{2F}$ and that a combined focal length of said lens group 2C and said lens group 2D is set as $f_{2R}$, that is, $$-0.7 < \frac{f_{2F}}{f_{2R}} < +0.1. \quad (1)$$

13. The wide-angle three-group zoom lens according to claim 12, wherein conditional equation (2) provided below is satisfied, provided that a radius of curvature of an object-side cementing surface of said lens group 2B is taken as $R_{22F}$ and an image-surface-side cementing surface of said lens group 2B is taken as $R_{22R}$, that is, $$-1.5 < \frac{R_{22R}}{R_{22F}} < +0.1. \quad (2)$$

* * * * *